P. H. WEDMARK.
PROCESS AND APPARATUS FOR PRODUCING PHOTOGRAPHIC NEGATIVES.
APPLICATION FILED MAR. 15, 1920.
1,379,949.
Patented May 31, 1921.
4 SHEETS—SHEET 1.
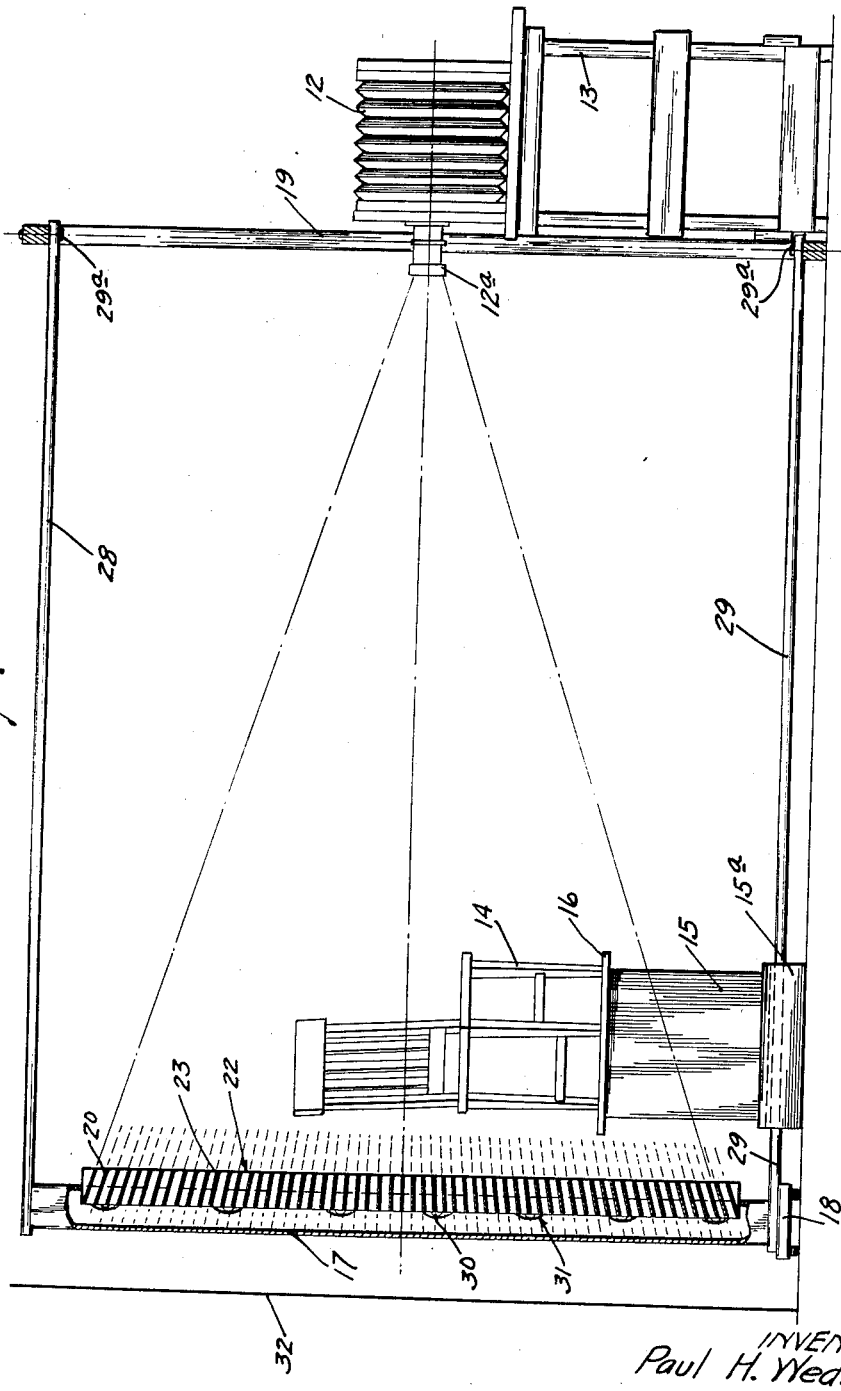
INVENTOR
Paul H. Wedmark
BY HIS ATTORNEYS
Williamson Merchant

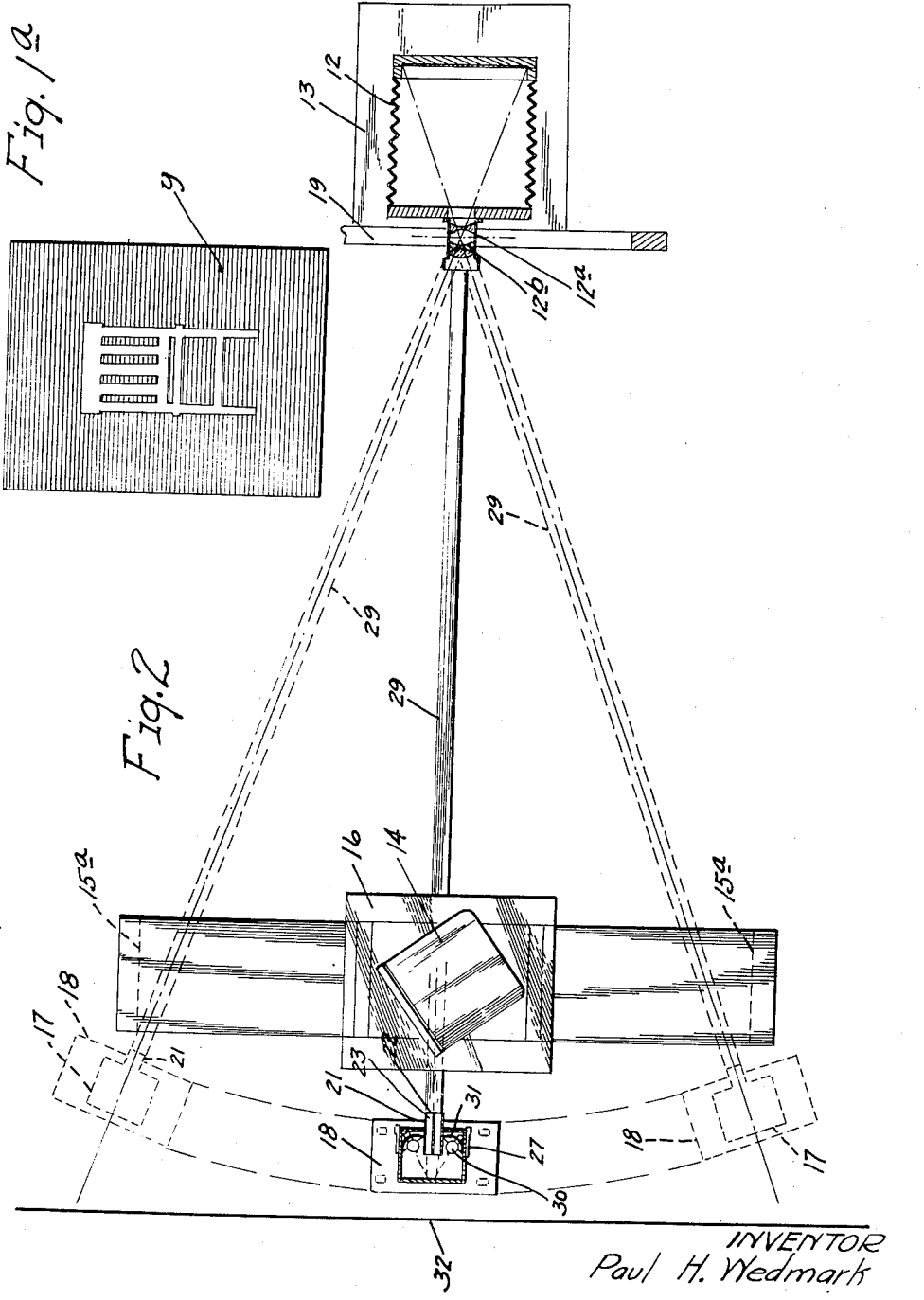

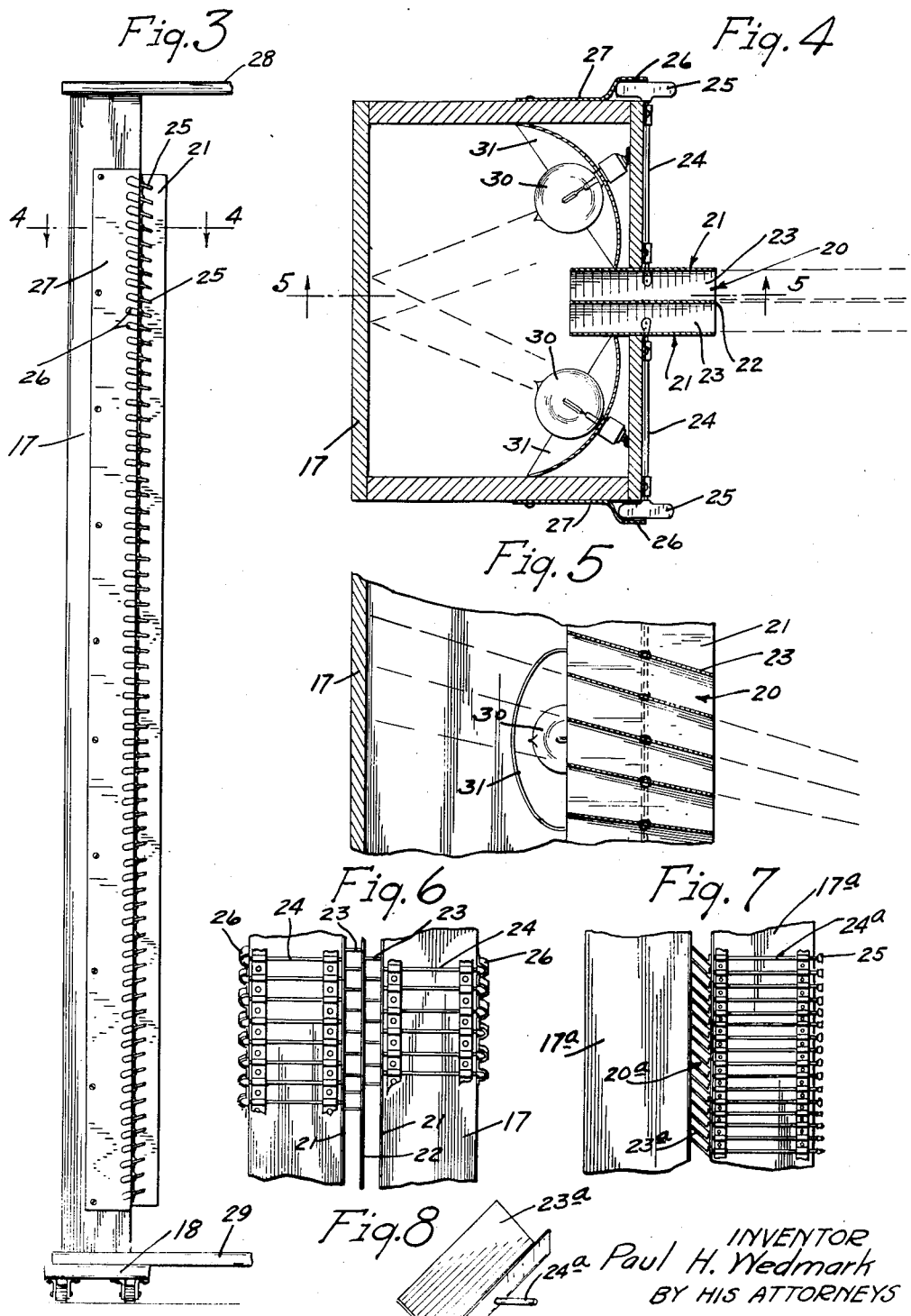

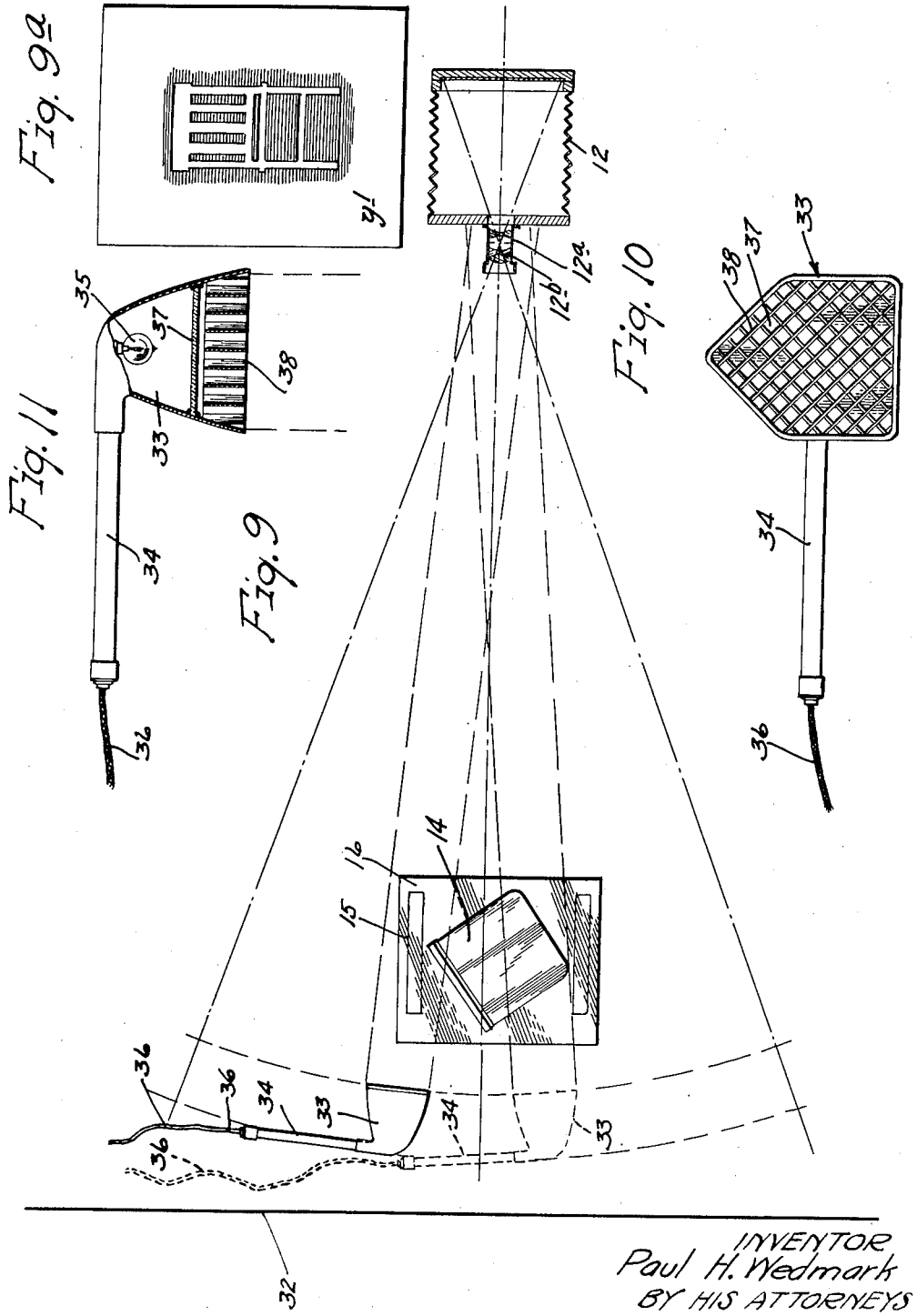

UNITED STATES PATENT OFFICE.

PAUL H. WEDMARK, OF MINNEAPOLIS, MINNESOTA.

PROCESS AND APPARATUS FOR PRODUCING PHOTOGRAPHIC NEGATIVES.

1,379,949.         Specification of Letters Patent.       Patented May 31, 1921.

Application filed March 15, 1920. Serial No. 365,775.

*To all whom it may concern:*

Be it known that I, PAUL H. WEDMARK, a citizen of the United States, residing at Minneapolis, in the county of Hennepin and State of Minnesota, have invented certain new and useful Improvements in Processes and Apparatus for Producing Photographic Negatives; and I do hereby declare the following to be a full, clear, and exact description of the invention, such as will enable others skilled in the art to which it appertains to make and use the same.

My invention relates to the art of photography and includes both a process and an apparatus, whereby, during the period of exposure of the sensitized film or plate, there is produced such an illuminated background for the object being photographed that the profile of the object will be clearly outlined by a dark or black background on the developed negative and a light or white background on the positive or developed print.

Hitherto, it has for years been the common practice when photographs or positive prints with clearly defined profiles or outlines have been desired, to photograph the object against an immovable white or highly illuminated background covering the entire field of the photograph, but when photographs have been thus taken, there has always been this serious defect, that in the profile of the object being photographed, there will be a "fogged effect" produced by light coming from the background toward the lens and striking the object at all sorts of angles. It has been the common practice, by the use of a brush, in an operation known as "opaquing," to outline the image, as well as could be done by hand, by painting a dark background around the image. This opaquing is a hand operation performed by a brush or pen and requiring not only great skill, but much time, and moreover, in the photographing of objects having very irregular and finely drawn lines, anything approaching perfection is impossible even by the most skilful artists.

I have found that the necessity for opaquing may be entirely done away with and negatives may be made, during the period of exposure, which will produce prints or positives with perfect outline or profiles and white or light backgrounds, by using a background light-font and moving the same back of the object being photographed while directing the rays toward the lens of the camera, so that such light rays are substantially focused in the lens.

The important results thus accomplished will be further considered after having described several forms of the apparatus for carrying out the improved process above generally outlined.

In the accompanying drawing which illustrate the invention, like characters indicate like parts throughout the several views.

Referring to the drawings:

Figure 1 is a view partly in side elevation and partly in vertical section illustrating what is believed to be the preferred form of the apparatus;

Fig. 1ª illustrates a negative taken by the apparatus illustrated in Figs. 1 and 2;

Fig. 2 is a view chiefly in plan but with some parts in horizontal section showing the same parts that were illustrated in Fig. 1;

Fig. 3 is a side elevation of the light-font shown in Figs. 1 and 2;

Fig. 4 is an enlarged horizontal section taken on the line 4—4 of Fig. 3;

Fig. 5 is a vertical section taken on the line 5—5 of Fig. 4;

Fig. 6 is a fragmentary front elevation of the light-font shown in Fig. 3;

Fig. 7 is a view corresponding to Fig. 6, but illustrating a modified construction;

Fig. 8 is a perspective view showing one of the shutters employed in the construction illustrated in Fig. 7;

Fig. 9 is a plan view corresponding to Fig. 2, but illustrating the modified form of the movable light-font;

Fig. 9ª illustrates a negative made with the apparatus shown in Figs. 9, 10 and 11;

Fig. 10 is a front or face elevation of the light-font shown in Fig. 9; and

Fig. 11 is a view partly in plan and partly in horizontal section of the light-font shown in Figs. 9 and 10.

Referring first to the construction illustrated in Figs. 1 to 6, inclusive, the numeral 12 indicates a camera shown as placed on a table 13. The numeral 14 indicates an object to be photographed, the same, as shown, being a chair placed on a table 15, the latter preferably having a glass top 16, and the table and object being properly positioned in front of the camera. The table 15 has a transversely elongated base 15ª for a purpose which will presently appear.

The movable light-font here illustrated comprises a narrow vertically extended light tube or chamber 17, which, at its lower end, is preferably mounted on a small wheel-equipped frame or truck 18 that runs upon the floor.

The numeral 19 indicates an upright rectangular frame that is rigidly secured in respect to the table 13 and extends on opposite sides and above and below the lens tube 12ª of the camera 12. This tube 12ª (see particularly Fig. 2) has the usual compound lens 12ᵇ.

In its front wall, that is, in its side that faces the camera, the light-font tube 17 is provided with a plurality of vertically spaced light passages 20 formed between fixed vertically extended outer plates 21, and intermediate plates 22 and interposed deflecting plates 23. The deflecting plates 23 are angularly adjustable, so that the light passages 20 may all be directed toward the lens 12ᵇ of the camera. Moreover, it will be noted that the light passages 20 are arranged in two vertical columns with the passages of one column staggered in respect to the other column. The interiors of the light passages 20 should be painted black. Each deflecting plate 23 is secured to the inner end of a horizontal stem 24 mounted in suitable bearings on the front of the light tube 17 and provided at its outer end with a flattened head 25. The adjusting heads 25 are thus alined vertically in two colums, and the heads of each column are engaged with notches or seats 26 formed in adjusting plates 27 that are rigidly but removably secured to the outer sides of the light tube 17.

It will, of course, be understood that the adjustment of the deflecting plates 23 will vary with different distances of the light font from the camera, and hence, for different adjustments, different plates 27 will be provided.

The adjustment of the deflecting plates 23 takes care of the directing of the light passages 20 in a vertical direction toward the lens of the camera, but provision must be made for maintaining these light passages properly directed in a lateral direction toward the lens of the camera when the light font is moved laterally or horizontally back of the object being photographed. This movement is taken care of by providing upper and lower radius bars 28 and 29 that are rigidly secured to the upper and lower ends of the light tube 17 and are pivotally connected to the upper and lower portions of the fixed frame 19 by pivots 29ª that are in a vertical line that intersects the lens structure 12ᵇ of the camera. These radius bars, as is evident, will cause the light-font to move in a plane of the cylindrical surface generated from an axis that intersects, or approximately intersects the lens structure of the camera.

In the preferred arrangement, elecric light bulbs 30 are arranged in two vertical rows in the front portion of the light tube 17 and small reflectors 31 are placed back of these bulbs and arranged to project the light as against the back of the said light tube. As shown, the said light tube 17 is of a rectangular box-like form, and its interior will preferably be painted white. The numeral 32 indicates a dark background, such as a black screen or curtain.

The use of the novel apparatus above described in carrying out my improved process is as follows:

The exposure light used in taking the photograph may be natural or artificial light employed in the usual way, but, of course, should be controlled so as not to produce an over or under exposure when the photograph is being taken while the illuminated background is used. During the period of exposure, the background light-front will be moved one or more times through the zone back of the object being photographed. The moving light that illuminates the background momentarily will cause the production of a negative having a well defined profile, causing the finest detailed outline, even of objects such, for example, as leaves, flowers, ferns, laces, and the like, which are of such delicate formation that the exact outline thereof cannot possibly be given by the use of the brush in the ordinary opaquing operation. Moreover, during the greater or a considerable part of the exposure period, the negative is taken against a dark background which causes the surface details of the picture to be well developed. Moreover, this dark background prevents back reflection, and it is a well known fact that back reflection lightens the outline or profile of objects and gives the photographs of such objects a fogged appearance, but this I eliminate by my improved process and apparatus and am able to produce photographs having the finest outline. Otherwise stated, by the use of the movable light-font, the photographed image is given the desired clear profile or outline, the desired surface detail, and the necessity for the hand operation known as "opaquing" is entirely done away with.

Photographs developed from negatives made in accordance with this improved process and by the apparatus illustrated, will be dark adjacent to their edges, and a photograph of a round object, for example, will have its darkest lines at its sides, thereby reproducing the rounded effect. It has already been stated that fogging effects are eliminated and this is a fact, but it has, nevertheless, been found in practice that photographs made, as above described, wherein, for example, a forwardly located leg of a chair on the photograph overlies a portion of a rear leg, there will be a fine white line clearly indicating the line of demarcation between the two legs. This seems to be due to the slight deviation of angles of the light beams that are projected from any particular one of the light passages 20, and obviously, this produced effect is highly desirable, because it prevents front and rear parts of the object from being run together, so that the outlines between the two can be separately distinguished.

In the construction illustrated in Figs. 7 and 8, the light-font is provided with but one vertical row of light passages 20$^a$ formed between oblique deflecting plates 23$^a$ secured individually to adjusting rods 24$^a$ mounted in suitable bearings on the light tube or housing 17$^a$.

In Fig. 1$^a$, a developed negative is indicated by the character $y$ but on this negative, the chair there shown does not appear in perspective, although it would usually so appear. The only purpose of showing this negative is to illustrate the fact that the image is outlined by a dark background on the negative.

It will be noted that the lower radius bar 29, in the particular construction illustrated, is free to vibrate under the base 15$^a$ of the table 15, and it will be understood that the light tube 17 may be made adjustable and securable to the radius bars 28 and 29 at different distances from the camera. This latter noted adjustment, together with the adjustment of the deflecting plates 23, provides for pointing the light passages 20 always toward the lens of the camera. It is also important to note (see particularly Fig. 6) that the two vertical rows of light passages 20 are staggered so that, under movements of the light-font, one light passage will wipe out any streaks that would otherwise be produced by the deflecting plates, and thus give an even back light illumination under the travel of the light-font back of the image being photographed.

Referring now to the construction illustrated in Figs. 9, 10 and 11, the camera supporting table and the chair on the latter may be assumed to be, as already described, but here the light-font is a portable device adapted to be carried by the hand and moved by an operator. This light font comprises a lamp housing 33 provided with a laterally projecting handle 34 and with a light bulb 35 connected in circuit wires 36 brought into the housing through the handle 34. The numeral 37 indicates a plate of glass, preferably of opal color, set into and extending across the interior of the lamp housing 33. Outward of the plate 37, the housing 33 is provided with a plurality of cross partitions that form a multiplicity of parallel light projecting passages 38.

In the use of this hand-operated light-font back of the image being photographed, considerable skill will be necessary to keep the light passages 38 directed as nearly as possible, always toward the lens of the camera, and in the use of this hand carried device, the light will be projected around the margin of the image and that the image will have openings therein, also back of the openings, so that the negative will be made dark for a considerable distance around the image and in all openings, substantially as shown in Fig. 9$^a$, wherein the developed negative will be indicated by the character $y^1$. Of course, better work can be done with the apparatus illustrated in Figs. 1 to 5, inclusive, than can be done with the hand operated device shown in Figs. 9, 10 and 11, and much greater care and skill is required in the use of the latter than in the use of the former.

What I claim is:

1. The process of making photographic negatives which consists in moving a light-font back of the object being photographed during the period of exposure.

2. The process of making photographic negatives which consists in placing a dark background back of the object to be photographed and in moving a light-font in front of the dark background but back of the object during the period of exposure.

3. The process of making photographic negatives which consists in moving a light-font back of the object photographed during the period of exposure, and maintaining the projection of the light rays substantially focused in the lens of the camera.

4. The process of making photographic negatives which consists in placing a dark background back of the object to be photographed and in moving a light-font in front of the dark background but back of the object during the period of exposure, and maintaining the projection of the light rays substantially focused in the lens of the camera.

5. A photographic apparatus including a camera, and a background light-font positioned to project rays of light toward the camera, and adapted to be moved back of the object being photographed during the period of exposure.

6. A photographic apparatus including a camera, and a background light-font positioned to project rays of light toward the camera, and adapted to be moved back of the object being photographed during the period of exposure, the said light-font having a multiplicity of intermediately adjacent light passages.

7. A photographic apparatus including a camera, and a background light-font positioned to project rays of light toward the camera, and adapted to be moved back of the object being photographed during the period of exposure, the said light-font having a multiplicity of intermediately adjacent light passages, said light passages being arranged in a row and at an angle to each other so that all may be substantially focused in the lens of the camera.

8. A photographic apparatus including a camera, and a background light-font positioned to project rays of light toward the camera, and adapted to be moved back of the object being photographed during the period of exposure, the said light-font having a multiplicity of intermediately adjacent light passages, said light passages being arranged in a row and at an angle to each other so that all may be substantially focused in the lens of the camera, and means for moving said light-font on the arc of a circle having its center approximately in the lens of the camera.

9. A photographic apparatus including a camera, and a background light-font positioned to project rays of light toward the camera and adapted to be moved back of the object being photographed during the period of exposure, the said light-font having a multiplicity of intermediately adjacent light passages, said light passages being arranged in a row and at an angle to each other so that all may be substantally focused in the lens of the camera, means for moving said light-font on the arc of a circle having its center approximately in the lens of the camera, and means for varying the relative angles of said light passages to set said light-font for operative positions at different distances from the camera.

In testimony whereof I affix my signature in presence of two witnesses.

PAUL H. WEDMARK.

Witnesses:
EVA E. KÖNIG,
HARRY D. KILGORE.